US006725327B1

United States Patent
Espeseth et al.

(10) Patent No.: US 6,725,327 B1
(45) Date of Patent: Apr. 20, 2004

(54) SPACE-EFFICIENT EXPECTED ACCESS TIME ALGORITHM FOR HARD DISK DRIVE COMMAND QUEUE ORDERING

(75) Inventors: Adam Michael Espeseth, Rochester, MN (US); David Robison Hall, Rochester, MN (US); James Joseph Mosser, Rochester, MN (US); Steven Glenn Smith, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 754 days.

(21) Appl. No.: 09/638,253

(22) Filed: Aug. 14, 2000

(51) Int. Cl.[7] .............................................. G06F 12/00
(52) U.S. Cl. ...................................................... 711/112
(58) Field of Search ............................. 711/111, 112, 4

(56) References Cited

U.S. PATENT DOCUMENTS 6,571,298 B1 * 5/2003 Megiddo ........................ 710/5

OTHER PUBLICATIONS

The local disk controller. Gilbert E. Houtekamer, ACM SIGMETRICS Performance Evaluation Review, Proceedings of the 198 ACM SIGMETRICS conference on Measurement and modeling of computer systems. Aug. 1985, vol. 13 Iss 2.*

* cited by examiner

Primary Examiner—Matthew Kim
Assistant Examiner—Matthew D. Anderson
(74) Attorney, Agent, or Firm—Joan Pennington (57) ABSTRACT

A method and apparatus are provided for hard disk drive command queue ordering. For each command in the hard disk drive command queue, an expected access time is calculated including a probability of success calculation. A command in the hard disk drive command queue having a minimum calculated expected access time is identified. Then the identified command having a minimum calculated expected access time is executed. For an estimated seek time of less than a time for one full revolution, a probability of a miss multiplied by a time of one extra revolution is calculated and the result is added to an estimated seek time to provide the expected access time. For an estimated seek time of greater than a time for one full revolution, a probability of a make multiplied by a time of one extra revolution is calculated and the result is subtracted from an estimated seek time to provide the expected access time.

20 Claims, 6 Drawing Sheets

ARRIVAL BANDS (SIDs) 130

| SEEK DISTANCE (CYLINDER GROUPS) 132 | 0-2 | 0-2 | 3-5 | 3-5 | 6-8 | 6-8 | 9 | 9 |
|---|---|---|---|---|---|---|---|---|
| | MAKE | MISS | MAKE | MISS | MAKE | MISS | MAKE | MISS |
| 0-30 | 4 | 2 | 9 | 0 | 4 | 0 | 72 | 6 |
| 31-91 | 4 | 1 | 6 | 0 | 2 | 0 | 98 | 5 |
| 92-182 | 9 | 7 | 5 | 0 | 4 | 0 | 150 | 4 |
| 183-303 | 27 | 5 | 13 | 1 | 15 | 1 | 208 | 4 |
| 304-454 | 36 | 5 | 16 | 1 | 14 | 4 | 236 | 11 |
| 455-635 | 21 | 10 | 8 | 7 | 15 | 6 | 224 | 14 |
| 636-846 | 23 | 11 | 18 | 2 | 14 | 2 | 153 | 8 |
| 847-1087 | 42 | 13 | 14 | 3 | 10 | 2 | 173 | 6 |
| 1088-1358 | 42 | 13 | 18 | 3 | 17 | 2 | 221 | 8 |
| 1359-1559 | 62 | 19 | 26 | 3 | 30 | 3 | 238 | 7 |
| 1560-1990 | 67 | 25 | 22 | 1 | 22 | 2 | 163 | 3 |

SPACE-EFFICIENT EXPECTED ACCESS TIME ALGORITHM FOR HARD DISK DRIVE COMMAND QUEUE ORDERING

FIELD OF THE INVENTION

The present invention relates generally to the data processing field, and more particularly, relates to a space-efficient access time algorithm, method and apparatus for hard disk drive command queue ordering.

DESCRIPTION OF THE RELATED ART

In random access storage devices, such as hard disk drives, when more there are than one command to execute, the data to be accessed next is chosen from a list or a queue of outstanding commands. The hard disk drive includes firmware performing a scheduling algorithm to determine the optimal command execution order. In general, the goal of the scheduling algorithm is to minimize the average access time for its commands. Presently, hard disk drives use a Shortest-Access Time First (SATF) algorithm.

The conventional SATF algorithm works as follows: Given a set of commands in a queue, a command is chosen that can be started or accessed first. This calculation has two parts, the time to perform the seek and settle operation from the current cylinder to the target cylinder and the latency between this point and when the starting sector for the command is reached. The SATF algorithm depends on accurate estimates of this access time. If the estimate is too low, the actuator may settle on track after the desired sector has already passed rotationally. This is called a miss. A miss adds one full revolution to the access time, degrading performance. If the access time estimate is too high, the optimal command candidate is not chosen for execution.

One problem with the typical SATF algorithm is that each command in the queue is classified in a binary manner. Desirable candidates are determined to be either reachable or unreachable in a given number of revolutions. Unfortunately, due to the large number of external factors affecting actual seek performance binary decisions are inadequate.

A need exists for an improved method and apparatus for hard disk drive command queue ordering. To implement a SATF algorithm, the latency between the current position and the target position must be analyzed. The command having the shortest access time and an acceptable probability of success is chosen by the algorithm. The probability of success is the probability that the command will be executed in the expected amount of time without one or more missed revolutions. Using the probability of success to calculate an expected value is preferred.

SUMMARY OF THE INVENTION

A principal object of the present invention is to provide an improved method and apparatus for hard disk drive command queue ordering. Other important objects of the present invention are to provide such method and apparatus for hard disk drive command queue ordering that efficiently and effectively facilitates hard disk drive command queue ordering while enabling memory space efficiency and while maintaining expected access time accuracy; to provide such method and apparatus for hard disk drive command queue ordering substantially without negative effect and that overcome many of the disadvantages of prior art arrangements.

In brief, a method and apparatus are provided for hard disk drive command queue ordering. For each command in the hard disk drive command queue, an expected access time is calculated including a probability of success calculation. A command in the hard disk drive command queue having a minimum calculated expected access time is identified. Then the identified command having a minimum calculated expected access time is executed.

In accordance with features of the invention, for an estimated seek time of less than a time for one full revolution, a probability of a miss multiplied by a time of one extra revolution is calculated and the result is added to an estimated seek time to provide the expected access time. For an estimated seek time of greater than a time for one full revolution, a probability of a make multiplied by a time of one extra revolution is calculated and the result is subtracted from an estimated seek time to provide the expected access time.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
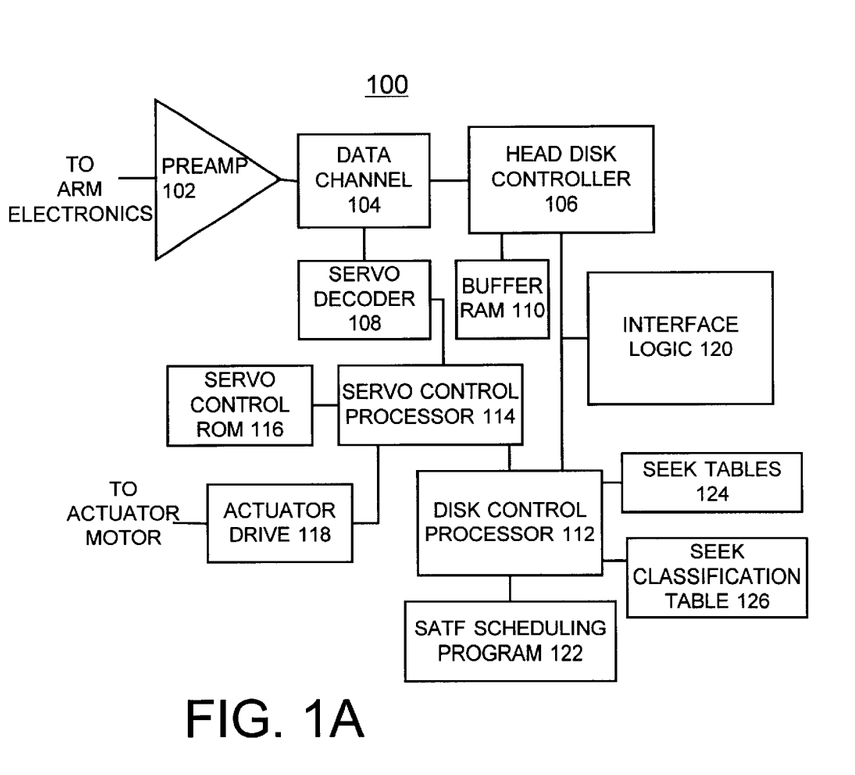
FIG. 1A is a block diagram representation illustrating a disk file system for implementing methods for implementing hard disk drive command queue ordering in accordance with the preferred embodiment.

Having reference now to the drawings, in FIG. 1, there is shown a disk file system for carrying out the scheduling method of the preferred embodiment generally designated by the reference character 100. Servo information and customer data are amplified by a preamplifier (preamp) 102. A data channel 104 uses sampling techniques for detecting the readback signals from the disk surfaces that contain the customer data. A head disk controller 106 is coupled to the data channel 104. A servo decoder 108 coupled to the data channel 104 provides a servo timing signal to the head disk controller 106. A buffer random access memory 120 is coupled to the head disk controller 106. A disk control processor 112 is coupled to the head disk controller 106 and to a servo control processor 114. A servo control read only memory (ROM) 116 and an actuator drive 118 are coupled to the servo control processor 114. The servo control processor 114 performs servo control functions providing servo positioning control signals to the actuator driver 118 that is coupled to an actuator motor assembly (not shown). An interface logic 120 coupled to the head disk controller 106 and the disk control processor 112 performs interface logic functions. Scheduling data accesses is provided with a shortest access time first (SATF) scheduling program 122 of the preferred embodiment coupled to the disk control processor 112. Seek tables 124 and a seek classification table 126 of the preferred embodiment utilized by the SATF scheduling program 122 are coupled to the disk control processor 112. Disk control processor unit 112 is suitably programmed to execute the flow charts of FIGS. 2A, 2B, and 2C of the preferred embodiment.

In accordance with features of the preferred embodiment, a SATF algorithm is implemented that evaluates the probability of successful completion in an expected access time. The SATF algorithm of the preferred embodiment classifies commands using various criteria and uses actual performance data to evaluate them. The SATF algorithm of the preferred embodiment is implemented using a fraction of the memory that would otherwise be required to achieve comparable performance. The SATF algorithm of the preferred embodiment also insures that the best possible queued performance is attained in the given operating environment. Temperature, head position, and external vibration are major factors that affect seek performance and access time. The SATF algorithm of the preferred embodiment is able to take these factors into account when making decisions.

The SATF algorithm of the preferred embodiment evaluates candidates using one of two equations. When the estimated seek time is expected to be less than the time of one full revolution, the following equation is used:

Expected Access Time=Estimated Seek Time+(Probability of Miss)*(Time of one Extra Revolution)

When the estimated seek time is expected to be greater than the time of one full revolution, the following equation is used:

Expected Access Time=Estimated Seek Time−(Probability of a Make)*(Time of one Extra Revolution)

The estimated seek time variable used is the above equations is looked up in one seek table 124 stored in memory. Each seek table 124 stores rotational time versus seek distance data. Two seek tables 124 are stored, one for read commands and one for write commands. When a seek distance is looked up in the table 124, a rotational time measured in servo IDs (SIDs) required to successfully perform the seek is returned. If the minimum rotational time is greater than the available rotational time, the time of one full revolution is added to the estimated seek time used in the calculation above. This type of seek table is currently used in expected access time algorithms.

The Probability of Miss and Probability of a Make variables used in the above calculations are determined using miss and make data as the drive 100 operates stored in the seek classification table 126 of the preferred embodiment. The make and miss data is a key part of the SATF algorithm of the preferred embodiment. Each seek is classified using several factors including the seek distance, the seek direction, the settling time and which head is executing the command. Since the miss probability is computed using the drive's past performance, the SATF algorithm of the preferred embodiment inherently adjusts to provide the best possible queued performance in the given operating environment.

When the above equations are used instead of relying on seek table data alone, queued performance is less dependent on the accuracy of the estimated seek time for each command. This allows for less memory to be used to make that calculation. The past performance history of each type of seek is used to make up for this lower degree of accuracy. This past performance history can be effectively stored in as little as 1 KB of memory.

Figure 1B:
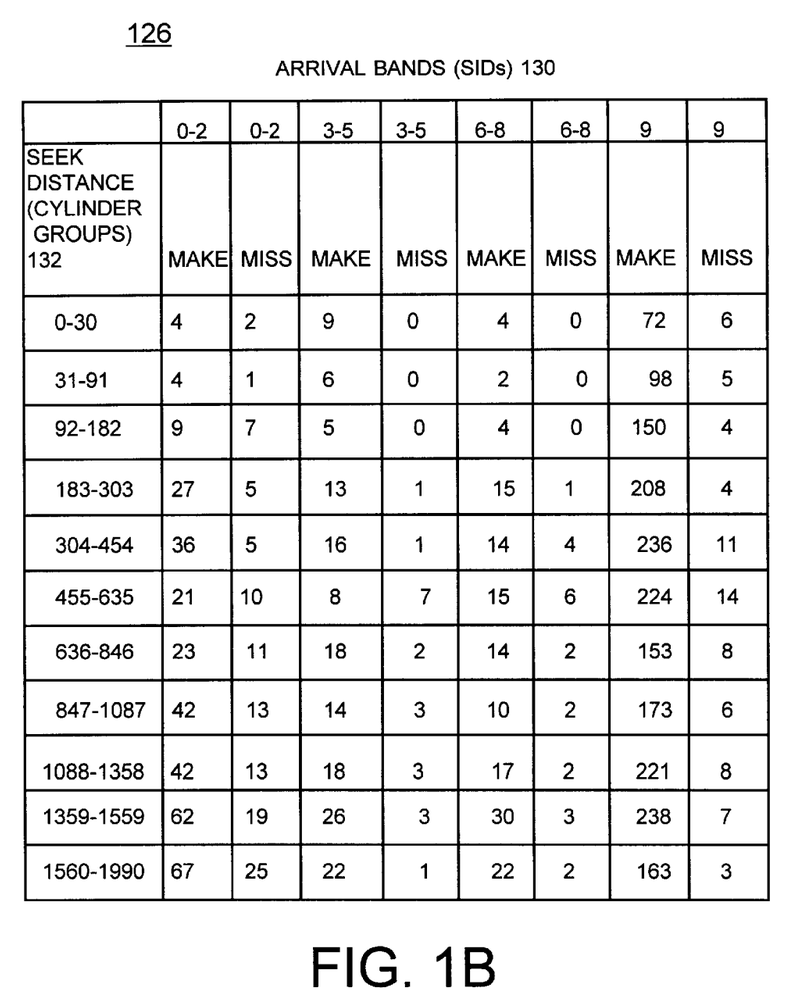
FIG. 1B is a diagram illustrating an example seek classification table for implementing hard disk drive command queue ordering in accordance with the preferred embodiment.

Referring now to FIG. 1B, there is shown an example seek classification table 126 for implementing hard disk drive command queue ordering in accordance with the preferred embodiment. When the drive's past performance history is stored and retrieved, it is classified according to the major factors that typify it. As shown in FIG. 1B, seek classification table 126 allows for memory space efficiency while maintaining expected access time accuracy. The main two dimensions used in classifying seeks are arrival bands 130 and seek distance or cylinder groups 132. Arrival bands 130 are groups of seeks that contain the same difference between the estimated seek time and the amount of time required to perform the seek. The arrival band 130 represents the difference in latency estimated to exist after the seek is complete. Cylinder groups 132 are groups of seeks that share the same seeking distance measured in cylinders. The arrival bands 130 are grouped linearly, while the cylinder groups 132 are grouped such that the same amount of rotational time is represented in each cylinder group. In other words, the groups are created in such a way that each cylinder group 132 corresponds to the same amount of seek table entries. For each entry in the arrival band 130 versus cylinder group 132 in the seek classification table 126, miss and make count values are stored. These miss and make count values are used to determine the Probability of Miss and Probability of a Make variables used in the above equations.

The number and size of the cylinder groups 132 and the arrival bands 130 can be varied depending on the amount of memory allotted for storing seek data. The command cost calculation becomes more accurate as the number of groups 130, 132 increases and the size of each group 130, 132 decreases. It should be understood that additional dimensions can be added to the seek classification table 126 when memory is available. For example, the additional dimensions may include head and seek direction.

Figure 2A:
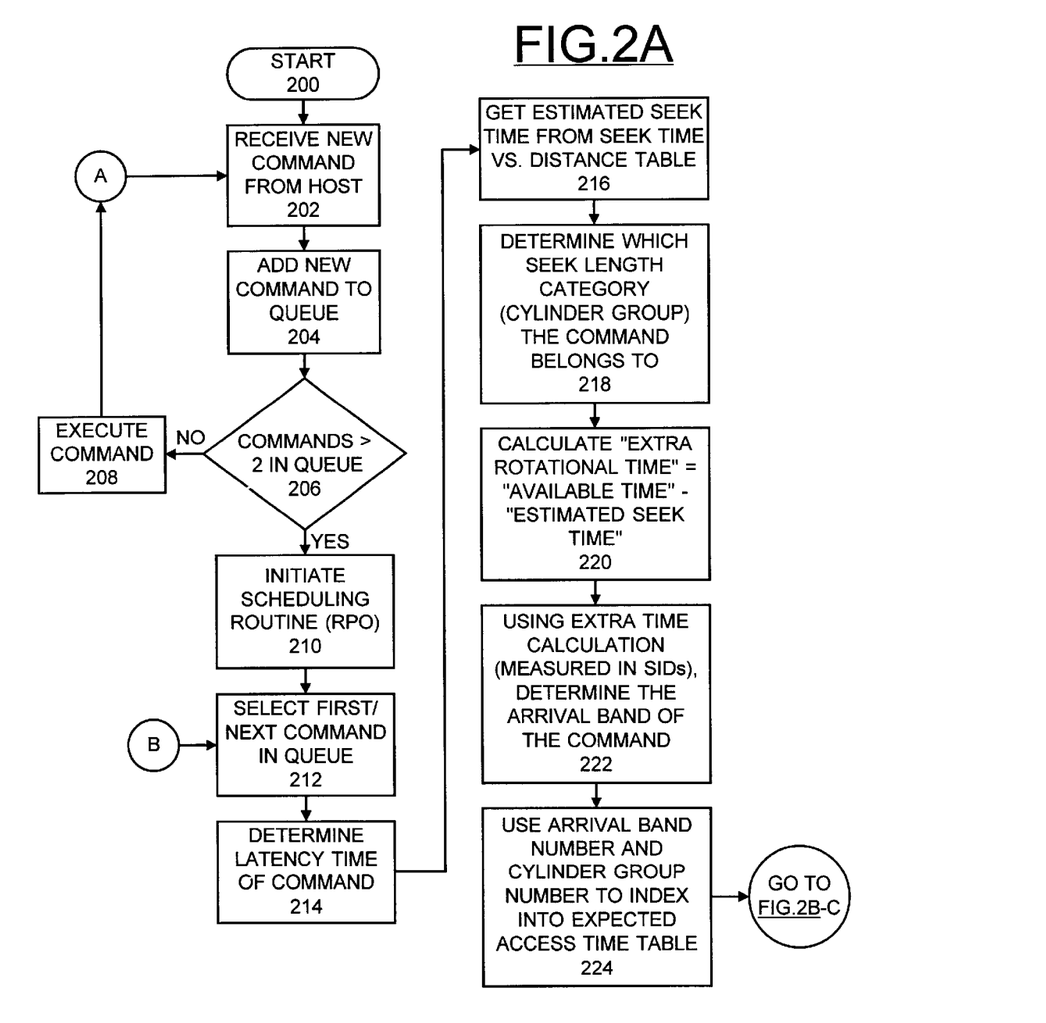
FIGS. 2A, 2B and 2C are flow charts illustrating exemplary sequential steps for implementing hard disk drive command queue ordering in accordance with the preferred embodiment.
Figure 2B:
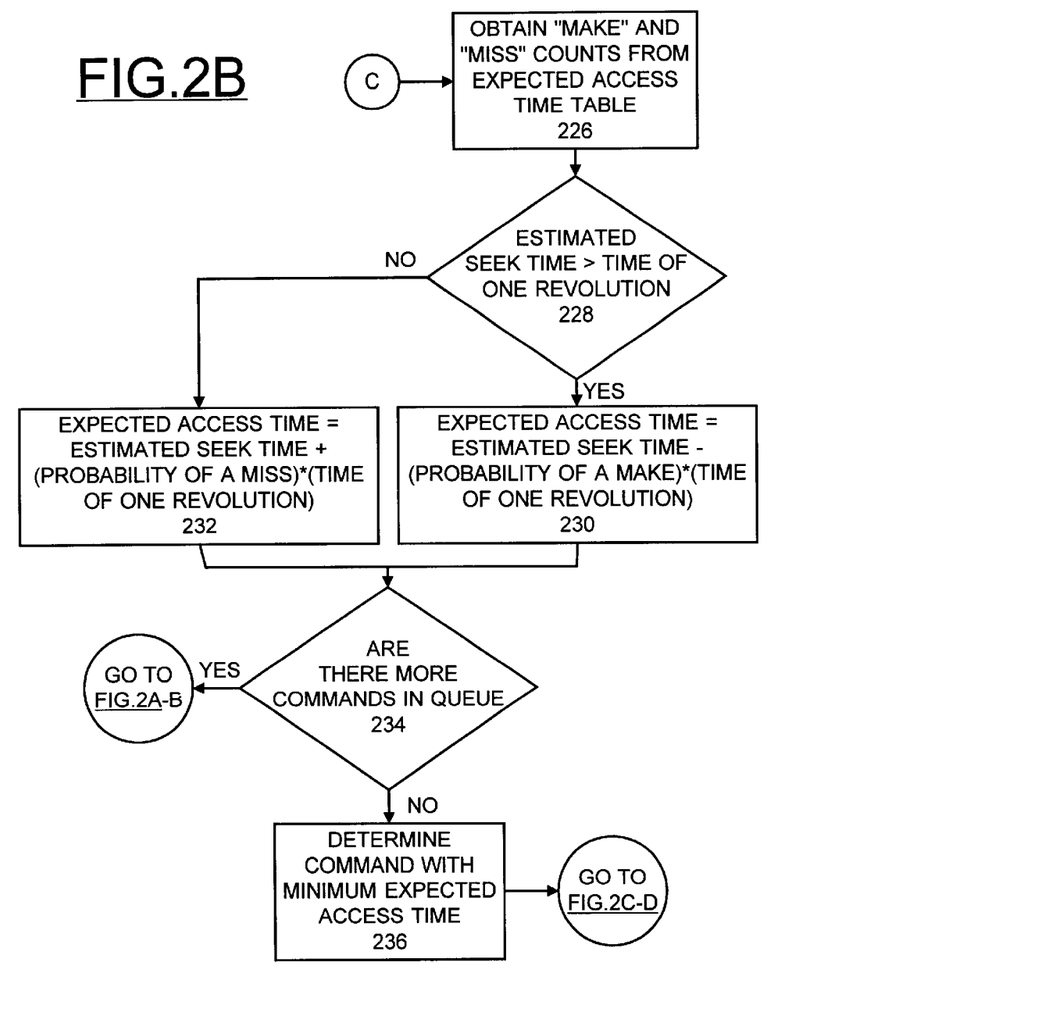
Figure 2C:
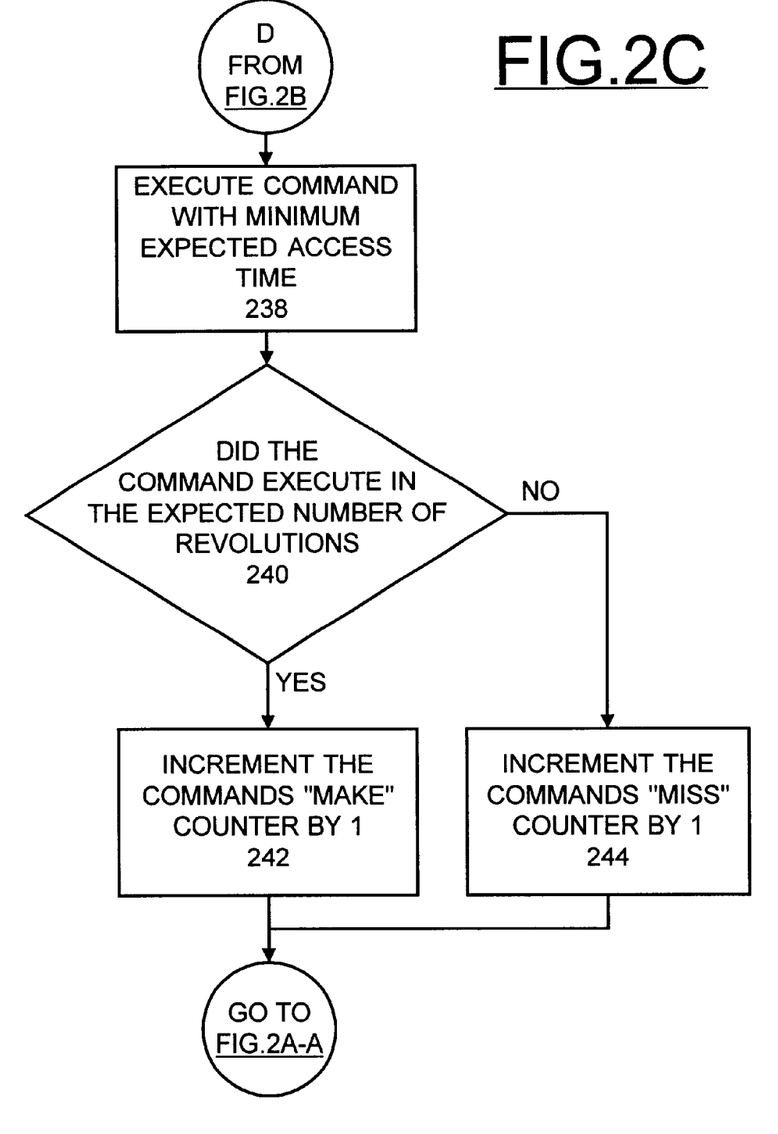

Referring now to FIGS. 2A, 2B and 2C, there are shown exemplary sequential steps for implementing hard disk drive command queue ordering in accordance with the preferred embodiment. In FIG. 2A sequential steps start at a block 200. A new command from the host is received as indicated in a block 202. The new command from the host is added to the queue as indicated in a block 204. Checking whether more than two commands are in the queue is performed as indicated in a decision block 206. If not, then a command is executed as indicated in a block 208. Then the sequential operations return to block 202 following entry point A to receive a new command for the host.

When more than two commands are in the queue, then a scheduling routine is initiated as indicated in a block 210. A first/next command in the queue is selected as indicated in a block 212. Next a latency time of the command is determined as indicated in a block 214. An estimated seek time from a seek time versus distance table 124 is obtained as indicated in a block 216. Which seek length category or cylinder group of the command is determined as indicated in a block 218. Then the extra rotational time equal to the available time minus the estimated seek time is calculated as indicated in a block 220. Using the extra time calculation measured in SIDs the arrival band 130 of the command is determined as indicated in a block 222. Next the arrival band 130 and cylinder group number 132 are used to index into expected access time table as indicated in a block 224.

Referring to FIG. 2B, make and miss counts are obtained from expected access time table 126 as indicated in a block 226. Next checking whether the estimated seek time is greater than time of one revolution is performed as indicated in a decision block 228. When the estimated seek time is greater than time of one revolution, then the expected access time is calculated as indicated in a block 230, where the expected access time equals the estimated seek time minus the result of the probability of a make times the time of one revolution. When the estimated seek time is not greater than time of one revolution, then the expected access time is calculated as indicated in a block 232, where the expected access time equals the estimated seek time plus the result of the probability of a miss times the time of one revolution. After the expected access time is calculated at block 230 or block 232, then it is determined whether there are more commands in the queue as indicated in a decision block 234. When there are more commands in the queue, then the sequential operations return to block 212 in FIG. 2A following entry point B. Otherwise, when there are no more commands in the queue, then the command with a minimum expected access time is identified as indicated in a block 236. Then the sequential operations continue in FIG. 2C following entry point D.

Referring to FIG. 2C following entry point D, the identified command with the minimum expected access time is executed as indicated in a block 238. Checking whether the command executed in the expected number of revolutions is performed as indicated in a decision block 240. When the command executed in the expected number of revolutions, the make counter is incremented by one as indicated in a block 242. When the command did not execute in the expected number of revolutions, the miss counter is incremented by one as indicated in a block 244. Then the sequential operations continue in FIG. 2A following entry point A to receive a new command from the host at block 202.

Figure 3:
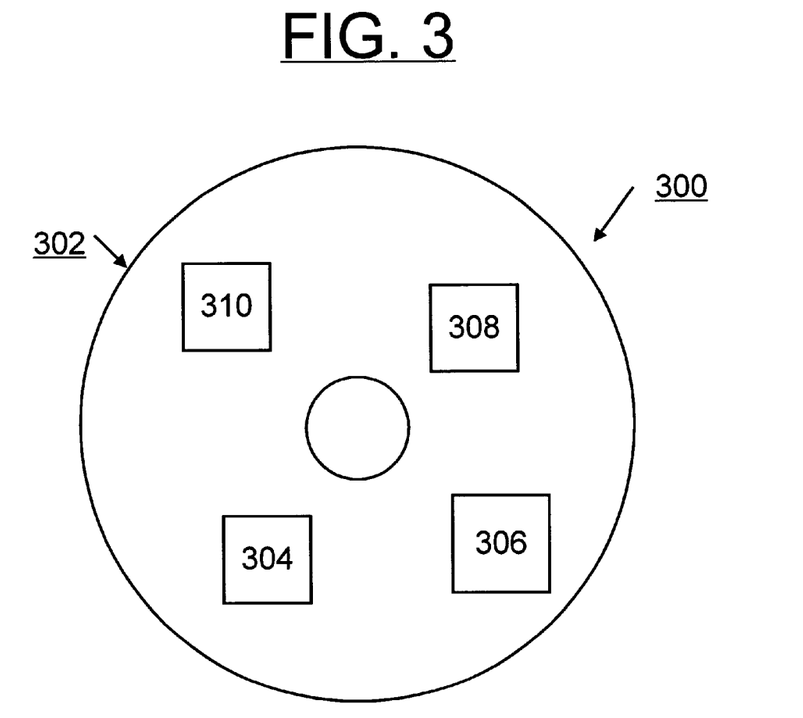
FIG. 3 is a block diagram illustrating a computer program product in accordance with the preferred embodiment.

Referring now to FIG. 3, an article of manufacture or a computer program product 300 of the invention is illustrated. The computer program product 300 includes a recording medium 302, such as, a floppy disk, a high capacity read only memory in the form of an optically read compact disk or CD-ROM, a tape, a transmission type media such as a digital or analog communications link, or a similar computer program product. Recording medium 302 stores program means 304, 306, 308, 310 on the medium 302 for carrying out the methods for implementing hard disk drive command queue ordering of the preferred embodiment in the disk file system 100 of FIG. 1.

A sequence of program instructions or a logical assembly of one or more interrelated modules defined by the recorded program means 304, 306, 308, 310, direct the disk file system 100 for implementing hard disk drive command queue ordering of the preferred embodiment.

While the present invention has been described with reference to the details of the embodiments of the invention shown in the drawing, these details are not intended to limit the scope of the invention as claimed in the appended claims.

What is claimed is:

1. A method for hard disk drive command queue ordering comprising the steps of:
   for each command in said hard disk drive command queue, calculating an expected access time including a probability of success calculation;
   identifying a command in said hard disk drive command queue having a minimum calculated expected access time; and
   executing said identified command having a minimum calculated expected access time.

2. A method for hard disk drive command queue ordering as recited in claim 1 wherein the step of for each command in said hard disk drive command queue, calculating an expected access time including a probability of success calculation includes the steps of: for an estimated seek time of less than a time for one full revolution, calculating a probability of a miss multiplied by a time of one extra revolution to provide a result.

3. A method for hard disk drive command queue ordering as recited in claim 2 further includes the step of: adding said result to an estimated seek time for said command.

4. A method for hard disk drive command queue ordering as recited in claim 1 wherein the step of for each command in said hard disk drive command queue, calculating an expected access time including a probability of success calculation includes the steps of: for an estimated seek time of greater than a time for one full revolution, calculating a probability of a make multiplied by a time of one extra revolution to provide a result.

5. A method for hard disk drive command queue ordering as recited in claim 1 wherein the step of for each command in said hard disk drive command queue, calculating an expected access time including a probability of success calculation includes the steps of: subtracting said result to an estimated seek time for said command.

6. A method for hard disk drive command queue ordering as recited in claim 1 includes the step of determining whether said executed command execute in an expected number of revolutions.

7. A method for hard disk drive command queue ordering as recited in claim 6 includes the step responsive to said executed command executing in said expected number of revolutions, of incrementing a make counter for said executed command.

8. A method for hard disk drive command queue ordering as recited in claim 6 includes the step responsive to said executed command failing to execute in said expected number of revolutions, of incrementing a miss counter for said executed command.

9. A computer program product for hard disk drive command queue ordering in a disk drive including a processor unit, said computer program product including a plurality of computer executable instructions stored on a computer readable medium, wherein said instructions, when executed by said processor unit, cause the processor unit to perform the steps of:
   for each command in said hard disk drive command queue, calculating an expected access time including a probability of success calculation; for an estimated seek time of less than a time for one full revolution, said probability of success calculation including a calculation of a probability of a miss multiplied by a time of one extra revolution, and for an estimated seek time of greater than a time for one full revolution, said probability of success calculation including a calculation of a probability of a make multiplied by a time of one extra revolution;
   identifying a command in said hard disk drive command queue having a minimum calculated expected access time; and
   executing said identified command having a minimum calculated expected access time.

10. A computer program product for hard disk drive command queue ordering in a disk drive as recited in claim 9 wherein said instructions, when executed by said processor unit, cause the processor unit to perform the steps of: adding a result of said calculation of a probability of a miss multiplied by a time of one extra revolution to an estimated seek time for said command.

11. A computer program product for hard disk drive command queue ordering in a disk drive as recited in claim 9 wherein said instructions, when executed by said processor unit, cause the processor unit to perform the steps of: subtracting a result of said calculation of a probability of a make multiplied by a time of one extra revolution to an estimated seek time for said command.

12. A computer program product for hard disk drive command queue ordering in a disk drive as recited in claim 9 wherein said instructions, when executed by said processor unit, cause the processor unit to perform the steps of: determining whether said executed command execute in an expected number of revolutions; and responsive to said executed command executing in said expected number of revolutions, of incrementing a make counter for said executed command.

13. A computer program product for hard disk drive command queue ordering in a disk drive as recited in claim 12 wherein said instructions, when executed by said processor unit, cause the processor unit to perform the steps of: responsive to said executed command failing to execute in said expected number of revolutions, of incrementing a miss counter for said executed command.

14. A computer program product for hard disk drive command queue ordering in a disk drive as recited in claim 13 wherein said instructions, when executed by said processor unit, cause the processor unit to perform the steps of: utilizing said miss and said make counters for calculating said probability of success.

15. Apparatus for hard disk drive command queue ordering comprising:

a processor;

a seek classification table coupled to said processor; said seek classification table including a plurality of cylinder groups, each cylinder group including a plurality of arrival bands and said seek classification table storing both make and miss counters for each entry in said arrival band versus cylinder group;

said processor for each command in said hard disk drive command queue, for calculating an expected access time including a probability of success calculation; said probability of success calculation utilizing said make and miss counters;

said processor for identifying a command in said hard disk drive command queue having a minimum calculated expected access time; and said processor for executing said identified command having a minimum calculated expected access time.

16. Apparatus for hard disk drive command queue ordering as recited in claim 15 wherein said processor for determining whether said executed command execute in an expected number of revolutions.

17. Apparatus for hard disk drive command queue ordering as recited in claim 16 wherein said processor responsive to said executed command executing in said expected number of revolutions, for incrementing said make counter for said executed command.

18. Apparatus for hard disk drive command queue ordering as recited in claim 15 wherein said processor responsive to said executed command failing to execute in said expected number of revolutions, for incrementing said miss counter for said executed command.

19. Apparatus for hard disk drive command queue ordering as recited in claim 15 wherein said processor for an estimated seek time of less than a time for one full revolution, for calculating a probability of a miss multiplied by a time of one extra revolution, and for an estimated seek time of greater than a time for one full revolution, for calculating a probability of a make multiplied by a time of one extra revolution.

20. Apparatus for hard disk drive command queue ordering as recited in claim 15 wherein said processor for subtracting a result of said calculation of a probability of a make multiplied by a time of one extra revolution to an estimated seek time for said command; and said processor for adding a result of said calculation of a probability of a miss multiplied by a time of one extra revolution to an estimated seek time for said command.

* * * * *